United States Patent
Tiwari et al.

(10) Patent No.: US 11,277,881 B2
(45) Date of Patent: Mar. 15, 2022

(54) EMERGENCY SERVICES SUPPORT FOR A DEVICE WHICH DOES NOT HAVE A VALID SUBSCRIPTION

(71) Applicant: NEC Corporation, Tokyo (JP)

(72) Inventors: Kundan Tiwari, Chennai (IN); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/322,695

(22) PCT Filed: Jan. 9, 2019

(86) PCT No.: PCT/JP2019/000359
§ 371 (c)(1),
(2) Date: Feb. 1, 2019

(87) PCT Pub. No.: WO2019/187486
PCT Pub. Date: Oct. 3, 2019

(65) Prior Publication Data
US 2021/0029776 A1    Jan. 28, 2021

(30) Foreign Application Priority Data
Mar. 28, 2018 (IN) .............................. 201811011621

(51) Int. Cl.
| H04W 76/50 | (2018.01) |
| H04L 65/1016 | (2022.01) |
| H04W 48/16 | (2009.01) |
| H04W 48/18 | (2009.01) |
| H04W 88/06 | (2009.01) |

(52) U.S. Cl.
CPC ......... *H04W 76/50* (2018.02); *H04L 65/1016* (2013.01); *H04W 48/16* (2013.01); *H04W 48/18* (2013.01); *H04W 88/06* (2013.01)

(58) Field of Classification Search
CPC .............................. H04W 76/50; H04W 88/06
USPC ....................................................... 455/404.1
See application file for complete search history.

(56) References Cited

U.S. PATENT DOCUMENTS

| 8,315,589 | B2* | 11/2012 | Li | H04W 76/50 |
| | | | | 455/404.1 |
| 2016/0212603 | A1* | 7/2016 | Chen | H04W 48/14 |
| 2018/0014338 | A1* | 1/2018 | Edge | H04W 12/08 |
| 2019/0069338 | A1* | 2/2019 | Kiss | H04W 4/90 |
| 2019/0327598 | A1* | 10/2019 | Suzuki | H04L 65/1069 |
| 2020/0305224 | A1* | 9/2020 | Chong | H04W 76/15 |

OTHER PUBLICATIONS

3GPP TS 23.501 V0.3.0 , 3$^{rd}$ Generation Partnership Project; Technical Specification Group Services and Systems Aspects; System Architecture for the 5G System; Stage 2 (Release 15), Feb. 28, 2017.

(Continued)

*Primary Examiner* — Qutbuddin Ghulamali

(57) ABSTRACT

This disclosure is related to a procedure to provide emergency services support for a UE which does not have a valid subscription for the serving PLMN. This disclosure more specifically provides procedure to support IMS emergency call or eCall support for a UE which is in limited state on a E-UTRA cell is connected to both EPC and 5GCN.

8 Claims, 9 Drawing Sheets

(56) References Cited

OTHER PUBLICATIONS

R2-1803050; 3GPP TSG-RAN WG2 Meeting #101; "Support for IMS Emergency Services in NR"; LG Electronics, Feb. 15, 2018.
R2-1801921; 3GPP TSG-RAN WG2 Meeting #101; "Consideration on PLMNs Connected to Both 5GC and EPC"; CATT, Feb. 16, 2018.
S2-183405; SA WG2 Meeting #127; "Discussion on Support of eCall and Emergency Services When E-UTRAN is Connected to EPC and 5GC"; NEC Corporation, Apr. 10. 2018.
International Search Report dated Mar. 28, 2019, issued in counterpart International Application No. PCT/JP2019/000359.
International Search Report dated Oct. 24, 2017, in corresponding PCT International Application.
3GPP TS23.501 V15.0.0 (Dec. 2017), "$3^{rd}$ Generation Partnership Project; Technical Specification Group Services and System Aspects; System Architecture for the 5G System; Stage 2, (Release 15)", pp. 1-181, (Dec. 2017).
3GPP TS38.300 V15.0.0 (Dec. 2017), "$3^{rd}$ Generation Partnership Project; Technical Specification Group Radio Access Network; NR; NR and NG-RAN Overall Description; Stage 2, (Release 15)", pp. 1-68, (Dec. 2017).
Japanese Office Action for JP Application No. 2020-547441 dated Apr. 20, 2021 with English Translation.
ZTE, vivo, Emergency service support indication per RAT, 3GPP TSG-CT WG1 Meeting #109, C1-181057, Feb. 13, 2018, Canada.
Rapporteur (Nokia), Miscellaneous Corrections & Additions, 3GPP TSG-RAN WG2 Meeting #101, R2-1803877, Mar. 12, 2018, Greece.
Japanese Office Communication for JP Application No. 2020-547441 dated Nov. 9, 2021 with English Translation.
NEC, "Support of emergency services when E-UTRAN is connected to EPC and 5GC", 3GPP TSG-SA2 Meeting #127, S2-183407, Apr. 10, 2018, China, pp. 1-3.

\* cited by examiner

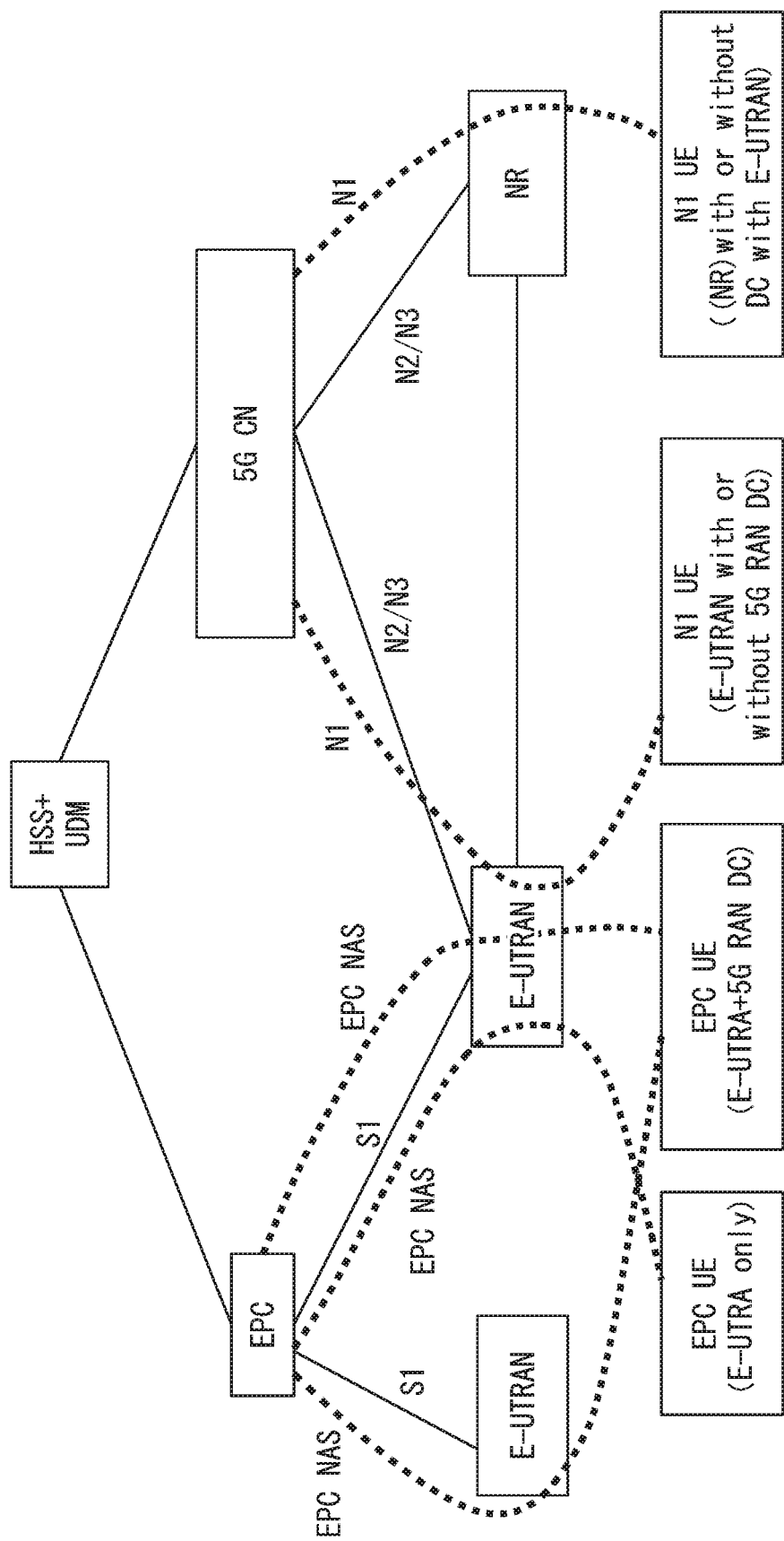

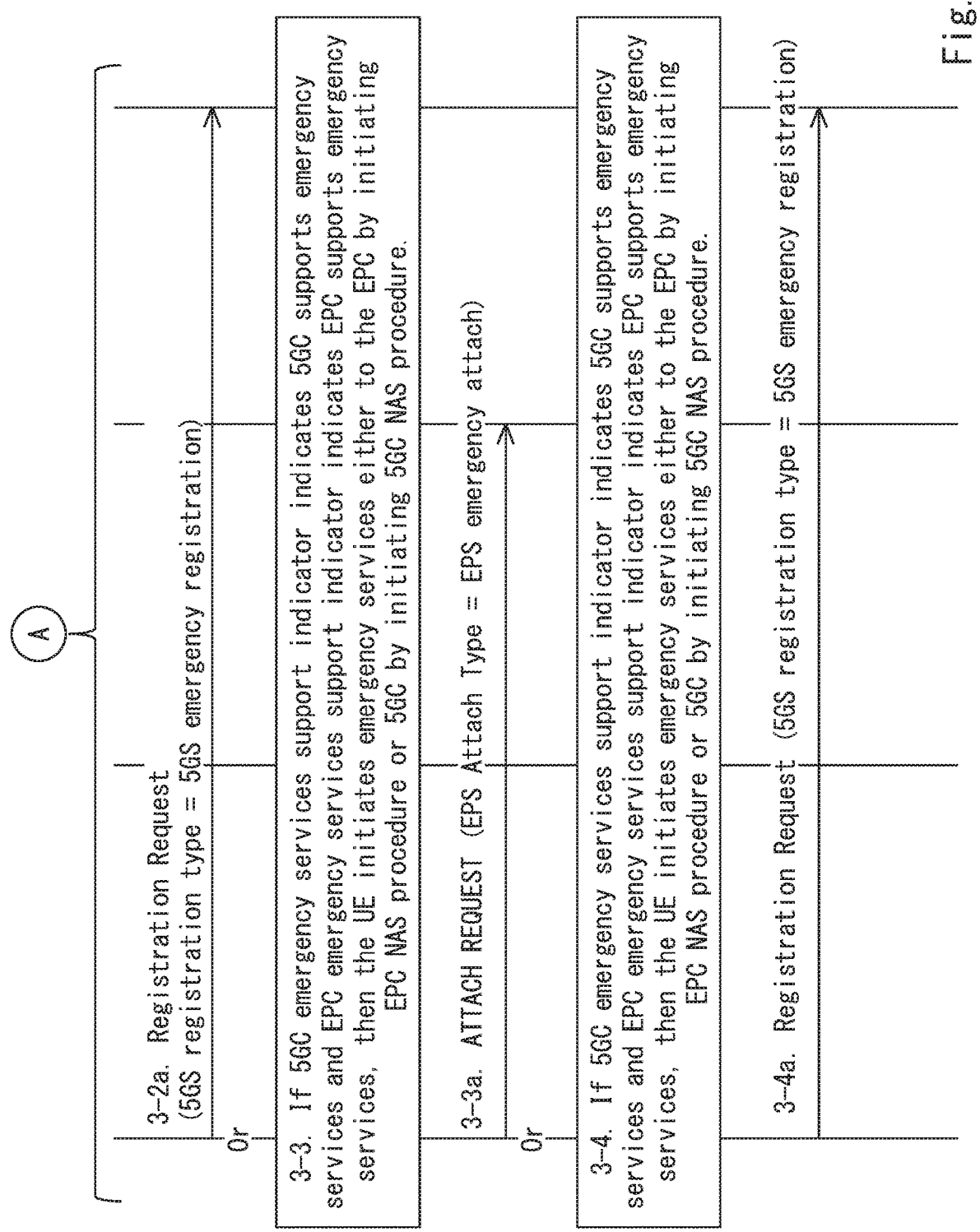

US 11,277,881 B2

EMERGENCY SERVICES SUPPORT FOR A DEVICE WHICH DOES NOT HAVE A VALID SUBSCRIPTION

CROSS-REFERENCE TO RELATED PATENT APPLICATIONS

This application is a National Stage Entry of International Application No, PCT/JP2019/000359, filed Jan. 9, 2019, which claims priority from Indian Patent Application No. IN 201811011621, filed Mar. 28, 2018. The entire contents of the above-referenced applications are expressly incorporated herein by reference.

TECHNICAL FIELD

This disclosure is related to a procedure to provide emergency services support for a UE which does not have a valid subscription for the serving PLMN.

BACKGROUND ART

This disclosure is related to the system information that is broadcasted from the base station to UEs who are camping on a cell of the base station. The system information may include network capabilities that are provided by the core network.

In general, there is one to one relationship between base station and a type of core network that the base station connects. However, as described in the FIG. 1, Non patent document 1 (TS23.501 V15.0.0) shows 5G System Architecture Figure 5.17.1.1-1, E-UTRAN can connects to both EPC and 5G CN (Core Network) at the same time.

This disclosure explains the detected issue in the architecture as depicted in FIG. 1 and provides solutions to the identified issues.

CITATION LIST

Non Patent Literature

NPL 1: 3GPP TS23.501 V15.0.0

SUMMARY OF INVENTION

Technical Problem

Some of the system information that is broadcasted from the base station are related to core network capabilities. This system information is referred by the UE when UE initiates a desired service in case that the broadcasted information indicates that the desired service is available.

According to the FIG. 1, E-UTRAN can connect to both EPC and 5G CN, while each core network may provide the limited number of network service available. For example, the network services that are provided by the EPC may be different from ones provided by the 5G CN.

With this situation, the UE may not get enough information when UE initiates a desired service because the system information that is broadcasted from the base station does not indicates which core network provides that service, or both core networks provide that service. With this ambiguity in system information, the UE may not get the desired service since the UE may attach to wrong core network to get the service.

There are, at least, three problematic cases that this disclosure focuses. See below for three cases.

Problematic Case 1:

A UE is unable to determine whether a cell connected to EPC and 5GCN supports IMS emergency call in limited state through EPC or 5GCN or both.

The UEs in limited service state determine that the cell supports emergency services over NG-RAN from a broadcast indicator (e.g. system information) in AS. An E-UTRAN cell can be connected to both 5GC and EPC and can support emergency services for the UE in limited service state either through EPC or 5GC or both EPC and 5GC. The E-UTRAN broadcasts only one bit to indicate support of emergency services in the cell. This bit can tell whether emergency services are supported on a cell but it cannot tell whether the emergency services are supported by EPC or 5GC. As a result the UE cannot determine whether EPC supports emergency services or 5GC supports emergency services.

Problematic Case 2:

A UE is unable to determine whether a cell of E-UTRAN which is connected to EPC and 5GC supports eCall through EPC or 5GC or both.

A UE in normal service state determines that a E-UTRAN cell supports eCall over IMS through access stratum broadcast indicator (e.g. system information) for eCall support over IMS and in limited service state through access stratum broadcast indicator for eCall and broadcast indicator tor IMS emergency services. A E-UTRAN connected to both EPC and 5GC broadcasts only one indicator whether eCall over IMS is supported or not for both EPC and 5GC. The UE in limited service state as well in normal service state cannot determine whether eCall over IMS is supported by EPC or 5GC or both of them. Therefore, the UE behaviour is undetermined whether the UE should perform eCall over IMS to EPC or 5GC if there is cell broadcasts only one indicator for eCall over IMS.

Problematic Operation 3:

A UE is unable to determine whether eDRX is allowed for EPC or 5GC or both EPC and 5GC for E-UTRAN cell connected to both EPC and 5GC.

Currently E-UTRAN cell broadcasts one indicator which indicates if eDRX in the cell is supported or not. However, when E-UTRAN is connected to both EPC and 5GC then it is not clear whether eDRX is allowed for the UE registered to EPC via the E-UTRAN or for the UE registered to 5GC via the E-UTRAN.

Solution to Problem

A method of a user equipment according to a first exemplary aspect of the present disclosure includes receiving system information block type 1 message that is broadcasted in a cell operated by an eNodeB that is connected to both EPC (Evolved Packet Core) and 5GC (5G Core), the system information block type 1 message including at least one of, ims-EmergencySupport information indicating whether the cell supports IMS (IP Multimedia Subsystem) emergency services via the EPC for the user equipment in limited service state, and ims-EmergencySupport5GC information indicating whether the cell supports IMS emergency services via the 5GC for the user equipment in limited service state, and determining that the cell supports IMS emergency services via at least one of the EPC and the 5GC, based on both of, whether or not the ims-EmergencySupport information is present in the system information block type 1 message, and whether or not the ims-EmergencySupport5GC information is present in the system information block type 1 message, wherein the method further comprises initiating IMS emergency services to the EPC, if the cell supports IMS emergency services via the EPC and if the cell does not support IMS emergency services via the 5GC, initiating IMS emergency services to the 5GC, if the cell supports IMS emergency services via the 5GC and if the cell does not support IMS emergency services via the EPC, or initiating IMS emergency services to either the EPC or the 5GC, if the cell supports IMS emergency services via both the EPC and the 5GC.

A user equipment to a second exemplary aspect of the present disclosure includes a transceiver and a controller configured to receive, via the transceiver, system information block type 1 message that is broadcasted in a cell operated by an eNodeB that is connected to both EPC (Evolved Packet Core) and 5GC (5G Core), the system information block type 1 message including at least one of ims-EmergencySupport information indicating whether the cell supports IMS (IP Multimedia Subsystem) emergency services via the EPC for the user equipment in limited service state, and ims-EmergencySupport5GC information indicating whether the cell supports IMS emergency services via the 5GC for the user equipment in limited service state; and determine that the cell supports IMS emergency services via at least one of the EPC and the 5GC, based on both of whether or not the ims-EmergencySupport information is present in the system information block type 1 message, and whether or not the ims-EmergencySupport5GC information is present in the system information block type 1 message, wherein the controller is further configured to initiate IMS emergency services to the EPC, if the cell supports IMS emergency services via the EPC and if the cell does not support IMS emergency services via the 5GC, initiate IMS emergency services to the 5GC, if the cell supports IMS emergency services via the 5GC and if the cell does not support IMS emergency services via the EPC, or initiate IMS emergency services to either the EPC or the 5GC, if the cell supports IMS emergency services via both the EPC and the 5GC.

BRIEF DESCRIPTION OF DRAWINGS

FIG. 1 shows t 5G System Architecture.
FIG. 2B shows procedure to support emergency services for the UE in limited service state on a cell of E-UTRAN.

DESCRIPTION OF EMBODIMENTS

Figure 2A:
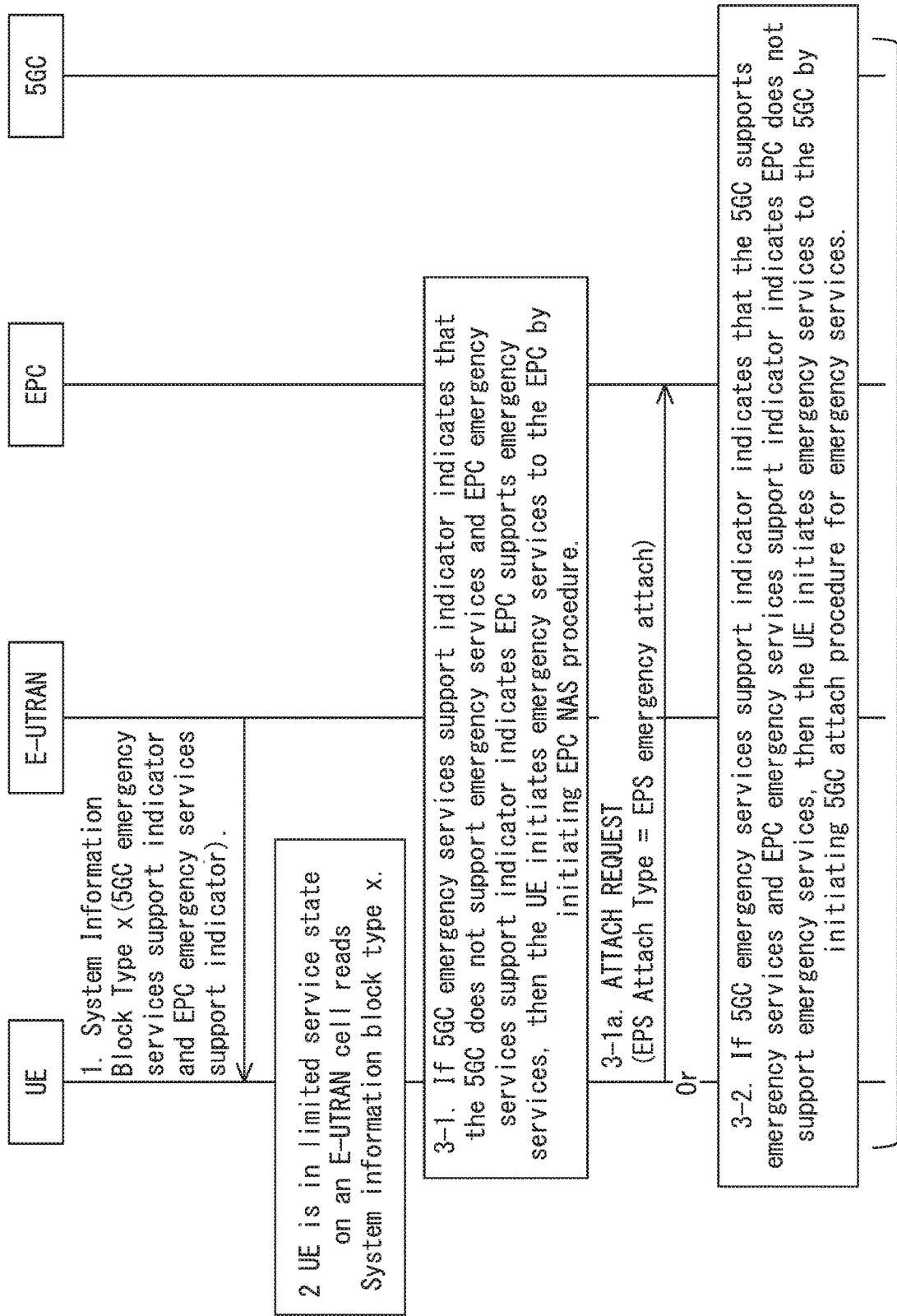
FIG. 2A shows procedure to support emergency services for the UE in limited service state on a cell of E-UTRAN.

For the purposes of the present document, the abbreviations given in TR 21.905 and the following apply. An abbreviation defined in the present document takes precedence over the definition of the same abbreviation, if any, in TR 21.905.
5GC 5G Core Network
5GS 5G System
5G-AN 5G Access Network
5G-GUTI 5G Globally Unique Temporary Identifier
5G-S-TMSI 5G S-Temporary Mobile Subscription Identifier
5QI 5G QoS Identifier
AF Application Function
AMF Access and Mobility Management Function
AN Access Node
AS Access Stratum
AUSF Authentication Server Function
CP Control Plane
DL Downlink
DN Data Network
DNAI DN Access Identifier
DNN Data Network Name
EDT Early Data Transmission
EPS Evolved Packet System
EPC Evolved Packet Core
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
MME Mobility Management Entity
N3IWF Non-3GPP InterWorking Function
NAI Network Access identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network. Slice Selection Assistance Information
NSSF Network Slice Selection Function
NSSP Network Slice Selection Policy
PCF Policy Control Function
PEI Permanent Equipment identifier
PER Packet Error Rate
PFD Packet Flow Description
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RQA Reflective QoS Attribute
RQI Reflective QoS Indication
RRC Radio Resource Control
SA NR Standalone New Radio
SBA Service Based Architecture
SBI Service Based interface
SD Slice Differentiator
SDAP Service Data Adaptation Protocol
SEAF Security Anchor Functionality
SEPP Security Edge Protection Proxy
SMF Session Management Function
S-NSSAI Single Network Slice Selection Assistance Information
SSC Session and Service Continuity SST Slice/Service Type
SUCI Subscription Concealed Identifier
SUPI Subscription Permanent Identifier
UDSF Unstructured Data Storage Function
UL Uplink
UL CL Uplink Classifier
UPF User Plane Function
UDR Unified Data Repository
URSP UE Route Selection Policy
E-UTRAN: E-UTRAN which can connect to 5CC or EPC or both EPC and 5GC. It is ng-eNB as defined in 3GPP TS 38.300.
Normal Service State: The UE is registered to the network (5GS or EPS) to get normal service.

First Embodiment (Solution 1 for Problematic Case 1):

E-UTRAN broadcasts two separate indicators to indicate support of emergency services by EPC and 5GC, i.e. EUTRAN broadcasts one indicator to indicate support of emergency services by EPC and another indicator to indicate support of emergency services by 5GC.

The main points of the solutions are listed as below.

The E-UTRAN is connected to both EPC and 5CC. The E-UTRAN broadcasts System Information block Type X containing one indicator (e.g. EPC emergency support indicator) to indicate support of emergency services by EPC and another indicator (e.g. 5CC emergency support indicator) to indicate support of emergency services by 5GC. The System Information block Type X may be a new System Information Block Type or existing System Information Block Type (e.g. System Information Block Type 1).

The UE reads System Information block. Type X. In other words, the UE receives the System Information block Type X and decodes contents of the System Information block Type X.

If one indicator indicates that the 5GC does not support emergency services and another indicator indicates EPC supports emergency services, then the UE initiates emergency services to the EPC by initiating EPC NAS procedure. The EPC NAS procedure includes the NAS Emergency ATTACH procedure, NAS ATTACH procedure and NAS Service Request procedure.

If one indicator indicates that the EPC does not support emergency services and another indicator indicates 5GC supports emergency services, then the UE initiates emergency services to the 5GC by initiating 5GC NAS procedure. The 5GC NAS procedure includes the NAS Emergency registration procedure, NAS registration procedure and NAS Service Request procedure.

If the two indicators indicate both 5GC and EPC supports emergency services then the UE can initiate emergency services to any of core network (5GC or EPC). If a UE emergency call to first core network type (e.g. EPC) fails then the UE initiates emergency call to second core network type (e.g. 5GC). The core network type is EPC or 5GC. In one scenario the emergency services to one core network type fails then the UE reties certain number of times to the same core network type before initiating emergency call on second core network.

If the two indicators indicate both 5GC and EPC supports emergency services then the UE can initiate emergency services to any of core network (5GC or EPC). The UE chooses a core network (5GC or EPC) and initiates emergency call by referring to another system information being broadcasted. (e.g. access restriction related information, service specific access barring information, etc.)

In all the cases in solution 1 the emergency services for EPC is emergency bearer services for the EPC.

IMS emergency call is a type of IMS emergency services for all the following scenarios. When the E-UTRAN indicates through a broadcast information that the cell support IMS emergency services by 5GC or EPC then the 5GC or EPC supports at least one IMS emergency service (e.g. IMS emergency voice call)

Detailed description of the steps of the FIGS. 2A and 2B are given below.

1. The E-UTRAN connected to both EPC and 5GC broadcasts one indicator (e.g. EPC emergency services support indicator) to indicate support of IMS emergency services by EPC and another indicator (e.g. 5GC emergency services support indicator) to indicate support of IMS emergency services by 5GC in system information block type X where is X is an integer. In one example the system information block type X may be System Information Block Type 1.

If the EPC supports IMS emergency services then the E-UTRAN broadcasts the system information block type X containing an indicator related to support of IMS emergency services by EPC. The indicator indicates that the IMS emergency services by EPC are supported. In one scenario the indicator is set to value "TRUE". In one example the indicator related to support of IMS emergency services by EPC is ims-EmergencySupport-r9 in SystemInformationBlockType1.

If the EPC does not support IMS emergency services then the E-UTRAN does not send the indicator related to support of IMS emergency services by EPC. In other scenario, if the EPC does not support emergency services then the E-UTRAN sends the indicator which is set to "emergency services not supported" (in one example the indicator is set to "False").

If the 5GC supports IMS emergency services then the E-UTRAN broadcasts the System Information Block Type X containing an indicator related to support of IMS emergency services by 5GC. The indicator indicates that the emergency services by 5GC are supported. In one scenario the indicator is set to value "TRUE".

In one example, if the 5GC does not supports emergency services then the E-UTRAN does not send the indicator related to support of emergency services by 5GC. In other scenario, if the 5GC does not support emergency services then the E-UTRAN sends the indicator which is set to "emergency services not supported" (in one example the indicator is set to "False").

The System Information block Type X may be a new System Information Block Type or existing System Information Block Type (e.g. System Information Block Type 1).

The UE reads the System Information Block Type X. In other words, the UE receives the System Information Block Type X and decodes contents of the System Information Block Type X.

3-1. The UE determines that the E-UTRAN supports IMS emergency services by EPC and does not support IMS emergency services by 5GC if the following conditions are satisfied:

(1) the indicator related to support of IMS emergency services by 5GC indicates that the 5GC does not support IMS emergency services or the indicator related to support of IMS emergency services by 5GC is not present in the System information Block Type X, and (2) the another indicator related to support of IMS emergency services by EPC indicates that the IMS emergency services by EPC are supported.

Upon receiving a request to initiate an emergency service from an upper layer (e.g. NAS layer), the UE initiates an IMS emergency service to EPC by sending ATTACH REQUEST message containing EPS attach type set to EPS emergency attach (3-1a). After completing emergency attach procedure and establishing the PDN connection for emergency services, the UE initiates an emergency service (e.g. IMS emergency call). The UE does not initiate IMS emergency services to 5GC in the E-UTRAN cell in the case above.

3-2. The UE determines that the E-UTRAN supports IMS emergency services by 5GC and does not support IMS emergency services by EPC if the following conditions are satisfied:

(1) the indicator related to support of IMS emergency services by EPC indicates that the EPC does not support IMS emergency services or the indicator related to support of IMS emergency services by EPC is not present in the System Information Block Type X, and (2) the another indicator related to support of IMS emergency services by 5GC indicates that the IMS emergency services by 5GC are supported.

Upon receiving a request to initiate an emergency service from an upper layer (e.g. NAS layer), the UE initiates an IMS emergency service to 5GC by sending Registration Request message containing 5GS registration type set to 5GS emergency registration (3-2a). After completing emergency registration procedure and establishing the PDU session for emergency service, the UE initiates an emergency service (e.g. IMS emergency call). The UE does not initiate IMS emergency services to EPC in the E-UTRAN cell in the case above.

3-3 The UE determines that the E-UTRAN cell supports IMS emergency services by both 5GC and EPC if the following conditions are satisfied:

(1) the indicator related to support of IMS emergency services by EPC indicates that the EPC supports IMS emergency services, and (2) the another indicator related to support of emergency services by 5GC indicates that 5GC supports IMS emergency services.

In the case above, the UE initiates NAS procedure to either EPC or 5GC to get IMS emergency services in limited state service in the E-UTRAN cell. This flow (FIGS. 2A and 2B) indicates the case where the UE initiates NAS procedure to EPC. Upon receiving a request to initiate an emergency service from an upper layer (e.g. NAS layer), the UE initiates an IMS emergency service to EPC by sending ATTACH REQUEST message containing EPS attach type set to EPS emergency attach (3-3a). If the attach procedure to the EPC fails then the UE can initiate the registration procedure to another core network type (e.g. 5GC).

3-4 The UE determines that the E-UTRAN cell supports IMS emergency services by both 5GC and EPC if the following conditions are satisfied:

(1) the indicator related to support of IMS emergency services by EPC indicates that the EPC supports EMS emergency services, and (2) the another indicator related to support of IMS emergency services by 5GC indicates that 5GC supports IMS emergency service.

In the case above, the UE initiates NAS procedure to either EPC or 5GC to get IMS emergency services in limited state service in the E-UTRAN cell. This flow (FIGS. 2A and 2B) indicates the case where the UE initiates NAS procedure to 5GC. Upon receiving a request to initiate an emergency service from an upper layer (e.g. NAS layer), the UE initiates an IMS emergency service to 5GC by sending Registration Request message containing 5GS registration type set to 5GS emergency registration (3-4a). If the registration procedure to the 5GC fails then the UE can initiate the attach procedure to another core network type (e.g. EPC).

There are a few ways to broadcast support of IMS emergency services. Some examples of system information block Type as per the step 1 are shown below.

EXAMPLE 1

E-UTRAN broadcasts support of emergency services by EPC and no support of emergency services by 5GC as below.

```
1a. SystemInformationBlockType1-vxxx-IEs ::= SEQUENCE {
    ims-EmergencySupport-r9              ENUMERATED {true}
        OPTIONAL,      -- Need OR
    cellSelectionInfo-v920               CellSelectionInfo-v920
        OPTIONAL,      -- Cond RSRQ
    nonCriticalExtension                 SystemInformationBlockType1-v1130-IEs
        OPTIONAL
1b. SystemInformationBlockType1-vxxx-IEs ::= SEQUENCE {
    ims-EmergencySupport-r9              ENUMERATED {true}
        OPTIONAL,      -- Need OR
    ims-EmergencySupport-5GC-r15         ENUMERATED {false}
        OPTIONAL,      -- Need OR
    cellSelectionInfo-v920               CellSelectionInfo-v920
        OPTIONAL,      -- Cond RSRQ
    nonCriticalExtension                 SystemInformationBlockType1-v1130-IEs
        OPTIONAL
```

EXAMPLE 2

E-UTRAN broadcasts no support of IMS emergency services by EPC and but broadcasts support of IMS emergency services by 5GC as below.

```
2a. SystemInformationBlockType1-vxxx-IEs ::= SEQUENCE {
    ims-EmergencySupport-5GC-r15         ENUMERATED {true}
```

```
                                                     -continued

OPTIONAL,          -- Need OR
cellSelectionInfo-v920                    CellSelectionInfo-v920
   OPTIONAL,          -- Cond RSRQ
nonCriticalExtension                      SystemInformationBlockType1-v1130-IEs
   OPTIONAL
2b. SystemInformationBlockType1-v920-IEs ::= SEQUENCE {
   ims-EmergencySupport-r9                ENUMERATED {false}
   OPTIONAL,          -- Need OR
ims-EmergencySupport-5GC-r15              ENUMERATED {true}
   OPTIONAL,          -- Need OR
cellSelectionInfo-v920                    CellSelectionInfo-v920
   OPTIONAL,          -- Cond RSRQ
nonCriticalExtension                      SystemInformationBlockType1-v1130-IEs
   OPTIONAL
```

EXAMPLE 3

E-UTRAN broadcasts support of IMS emergency services by EPC and support of emergency services by 5GC as below.

```
3a. SystemInformationBlockType1-vxxx-IEs ::= SEQUENCE {
   ims-EmergencySupport-r9                ENUMERATED {true}
   OPTIONAL,          -- Need OR
ims-EmergencySupport-5GC-r15              ENUMERATED {true}
   OPTIONAL,          -- Need OR
cellSelectionInfo-v920                    CellSelectionInfo-v920
   OPTIONAL,          -- Cond RSRQ
nonCriticalExtension                      SystemInformationBlockType1-v1130-IEs
   OPTIONAL
```

Second Embodiment (Solution 2 for Problematic Case 2)

EUTRAN broadcasts two separate indicators to indicate support of eCall over IMS by EPC and 5GC. For example, EUTRAN broadcasts one indicator to indicate support of eCall over IMS by EPC and another indicator to indicate support of eCall over IMS by 5GC.

The E-UTRAN is connected to EPC and 5GC. The E-UTRAN cell broadcasts System Information block Type X containing one indicator (e.g. EPC eCall over IMSsupport indicator) to indicate support of emergency services by EPC and another indicator (e.g. 5GC eCall over IMS support indicator) to indicate support of eCall over IMS by 5GC. The System Information block Type X may be a new System Information Block Type or existing System Information Block Type (e.g. System Information Block Type 1).

The UE reads System Information block Type X. In other words, the UE receives the System Information block Type X and decodes contents of the System Information block Type X.

If one indicator indicates that the 5GC does not support eCall over IMS and another indicator indicates EPC supports eCall over IMS, then the UE initiates eCall over IMS to the EPC by initiating EPC NAS procedure. The EPC NAS procedure includes the NAS Emergency ATTACH procedure, NAS ATTACH procedure and NAS Service Request procedure.

If one indicator indicates that the EPC does not eCall over IMS and another indicator indicates 5GC supports eCall over IMS, then the UE initiates eCall over IMS to the 5GC by initiating 5GC NAS procedure. The 5GC NAS procedure includes the NAS Emergency registration procedure, NAS registration procedure and NAS Service Request procedure.

If the two indicators indicate both 5GC and EPC support eCall over IMS then the UE can initiate emergency services to any of core network (5GC or EPC) using corresponding NAS procedure. If a UE eCall over IMS to first core network type (e.g. EPC) fails then the UE initiates emergency call to second core network type (e.g. 5GC), The core network type is EPC or 5GC. In one scenario the eCall over IMS to one core network type fails then the UE retries certain number of times to the same core network type before initiating eCall over IMS on second core network type.

If the two indicators indicate both 5GC and EPC support eCall over IMS then the UE can initiate emergency services to any of core network (5GC or EPC). The UE chooses a core network (5GC or EPC) and initiates eCall over IMS by referring to another system information being broadcasted. (e.g. access restriction related information, service specific access barring information, etc.)

Figure 3A:
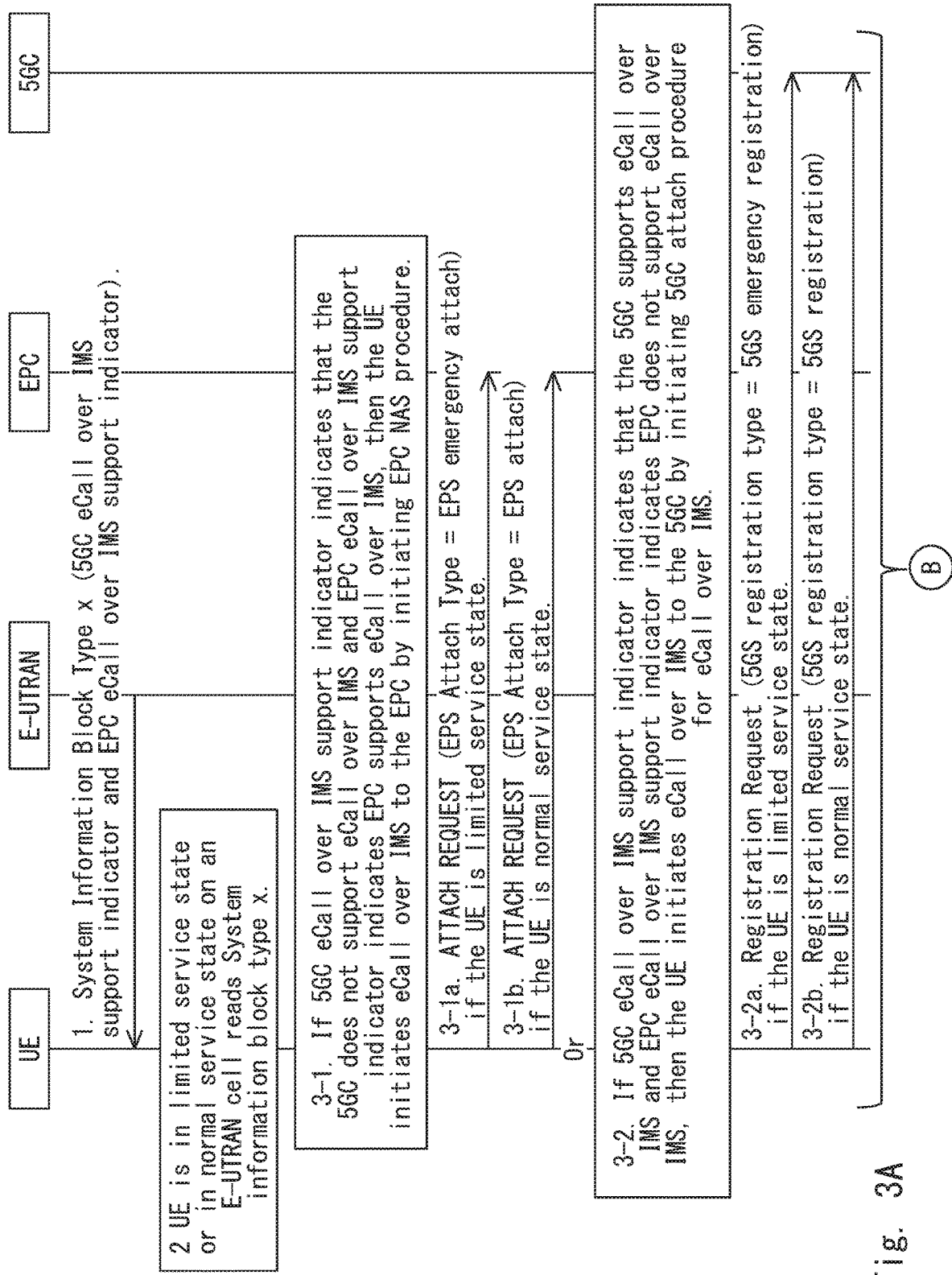
FIG. 3A shows procedure to support eCall over IMS for the UE in Normal service state or limited service state on a cell of E-UTRAN.
Figure 3B:
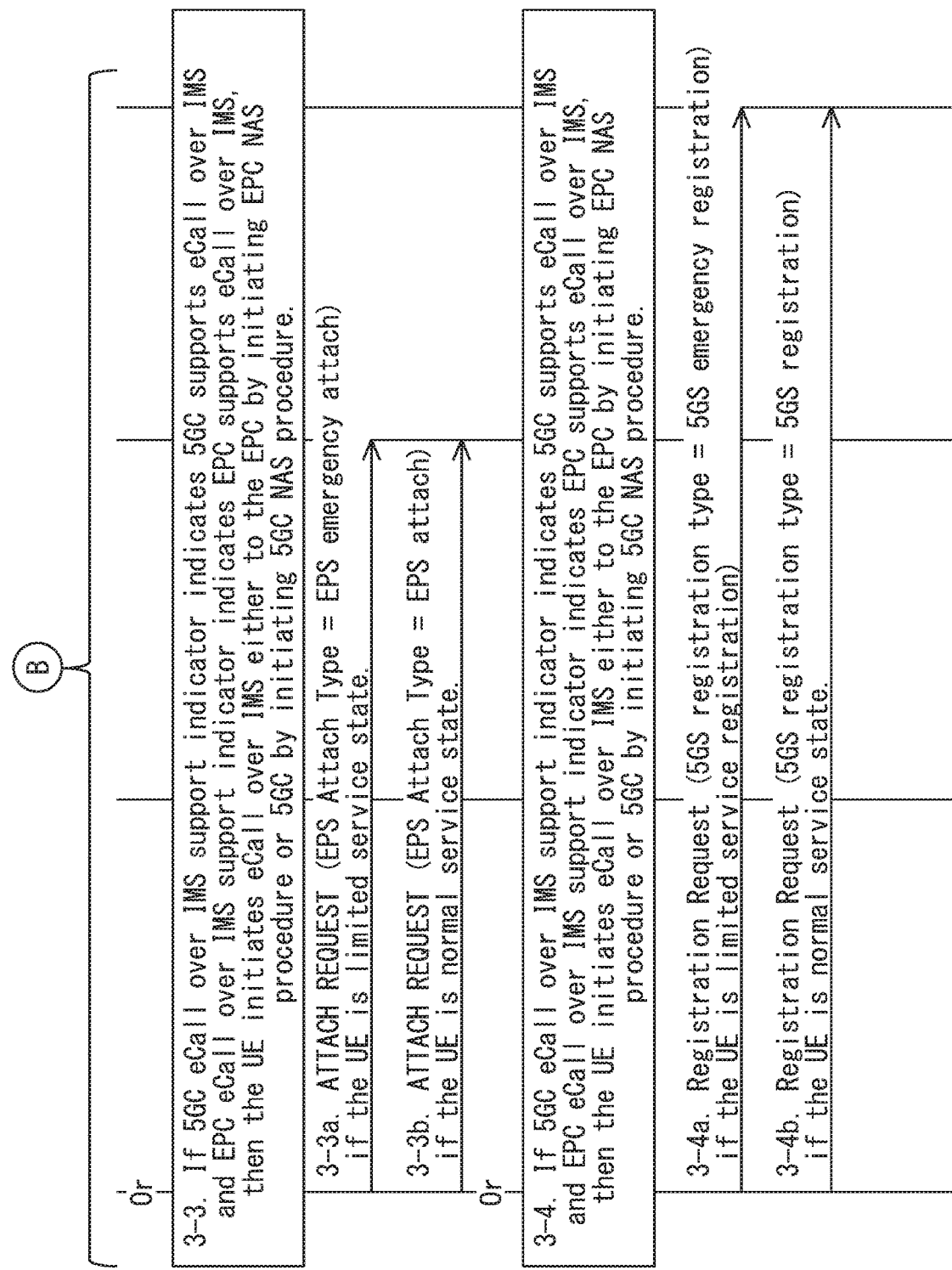
FIG. 3B shows procedure to support eCall over IMS for the LTE in Normal service state or limited service state on a cell of E-UTRAN.

FIGS. 3A and 3B: Procedure to support eCall over IMS for the UE in Normal service state or limited service state on a cell of E-UTRAN.

Detailed description of the steps of the FIGS. 3A and 3B are given below.

1. The E-UTRAN connected to both EPC and 5GC broadcasts one indicator (e.g. EPC eCall over IMS support indicator) to indicate support of eCall over IMS by EPC and another indicator (e.g. 5GC eCall over IMS support indicator) to indicate support of eCall over IMS by 5GC in system information block type X where is X is an integer. In one example the system information block type X may be System Information Block Type 1.

If the EPC supports eCall over IMS then the E-UTRAN broadcasts the system information block type X containing an indicator related to support of eCall over IMS by EPC. The indicator indicates that the eCall over IMS by EPC is supported. In one scenario the indicator is set to value "TRUE". In one example the indicator related to support of eCall over IMS by EPC is ims-EmergencySupport-r9 in SystemInformationBlockType1.

If the EPC does not supports eCall over IMS then the E-UTRAN do not sends the indicator related to support of eCall over IMS by EPC. In other scenario, if the EPC does not support eCall over IMS then the E-UTRAN sends the indicator which is set to "eCall over IMS not supported" (in one example the indicator is set to "False").

If the 5GC supports eCall over IMS then the E-UTRAN broadcasts the System Information Block Type X containing an indicator related to support of eCall over IMS by 5GC. The indicator indicates that the eCall over IMS by 5GC is supported. In one scenario the indicator is set to value "TRUE".

If the 5GC does not support eCall over IMS then the E-UTRAN does not send the indicator related to support of eCall over IMS by 5GC. In other scenario, if the 5GC does not support eCall over IMS then the E-UTRAN sends the indicator which is set to "eCall over IMS not supported" (in one example the indicator is set to "False").

The System Information block Type X may be a new System Information Block Type or existing System Information Block Type (e.g. System Information Block Type 1).

2. The UE reads the System Information Block Type X. In other words, the UE receives the System Information Block Type X and decodes contents of the System Information Block Type X 3-1. The UE determines that the E-UTRAN cell supports eCall over IMS by EPC and does not support eCall over IMS by 5GC if the following conditions are satisfied:
  (1) the indicator related to support of eCall over IMS by 5GC indicates that the 5GC does not support eCall over IMS or the indicator related to support of eCall over IMS by 5GC is not present in the System Information Block Type X, and
  (2) another indicator related to support of eCall over IMS by EPC indicates that the eCall over IMS by EPC is supported.

(3-1a) Upon receiving a request to initiate an eCall over IMS from an upper layer (e.g. NAS layer), the UE initiates an eCall over IMS to EPC by sending ATTACH REQUEST message containing EPS attach type set to EPS emergency attach if the UE is limited service state and the E-UTRAN cell indicates support of emergency bearer services for the UEs in limited service state.

(3-1b) Upon receiving a request to initiate an eCall over IMS from an upper layer, the UE initiates an eCall over IMS to EPC by sending ATTACH REQUEST message containing EPS attach type set to EPS attach if the UE is normal service state.

After completing emergency attach procedure or EPS attach procedure and establishing the PDN connection for eCall over IMS, the UE initiates an eCall over IMS to EPC. The UE does not initiate eCall over IMS to 5GC in the E-UTRAN cell in the case above.

3-2. The UE determines that the E-UTRAN cell supports eCall over IMS by 5GC and does not support eCall over IMS by EPC if the following conditions are satisfied:
  (1) the indicator related to support of eCall over IMS by EPC indicates that the EPC does not support eCall over IMS or the indicator related to support of eCall over IMS by EPC is not present in the System information Block Type X, and
  (2) the another indicator related to support of eCall over IMS by 5GC indicates that the eCall over IMS by 5GC is supported.

(3-2a) Upon receiving a request to initiate an eCall over IMS from an upper layer (e.g. NAS layer), the UE initiates an eCall over IMS to 5GC by sending Registration Request message containing 5GS registration type set to 5GS emergency registration and the E-UTRAN Bell indicates support of emergency bearer services for the UEs in limited service state.

(3-2b) Upon receiving a request to initiate an eCall over IMS from an upper layer, the UE initiates an eCall over IMS to 5GC by sending Registration Request message containing 5G attach type set to 5GS attach if the UE is normal service state.

After completing emergency registration procedure or 5GS registration procedure and establishing the PDU session for eCall over IMS, the UE initiates an eCall over IMS (e.g. IMS emergency call). The UE does not initiate eCall over IMS to EPC in the E-UTRAN cell in the case above.

3-3. The UE determines that the E-UTRAN cell supports eCall over IMS by both 5GC and EPC if the following conditions are satisfied:
  (1) the indicator related to support of eCall over IMS by EPC indicates that EPC support eCall over IMS, and
  (2) the indicator related to support of eCall over IMS by 5GC indicates that 5GC supports eCall over IMS.

(3-3a) The UE initiates NAS procedure to either EPC or 5GC to get eCall over IMS in limited state service in the E-UTRAN cell. This flow (FIG. 3) indicates the case where the UE initiates NAS procedure to EPC. If the emergency attach procedure to the EPC fails then the UE can initiate the emergency registration procedure to another core network type (e.g. 5GC).

(3-3b) The UE initiates NAS procedure to either EPC or 5GC to get eCall over IMS in normal service state in the E-UTRAN cell. This flow (FIG. 3) indicates the case where the UE initiates NAS procedure to EPC. If the attach procedure to the EPC fails then the UE can initiate the 5GS registration procedure to another core network type (e.g. 5GC).

3-4. The UE determines that the E-UTRAN cell supports eCall over IMS by both 5GC and EPC if the following conditions are satisfied:
  (1) the indicator related to support of eCall over IMS by EPC indicates that EPC support eCall over IMS, and
  (2) the indicator related to support of eCall over IMS by 5GC indicates that 5GC supports eCall over IMS.

(3-4a) The UE initiates NAS procedure to either EPC or 5GC to get eCall over IMS in limited state service in the E-UTRAN cell. This flow (FIG. 3) indicates the case where the UE initiates NAS procedure to 5GC. If the emergency registration procedure to the 5GC fails then the UE can initiate the emergency attach procedure to another core network type (e.g. EPC).

(3-4b) The UE initiates NAS procedure to either EPC or 5GC to get eCall over IMS in normal service state in the E-UTRAN cell. This flow (FIG. 3) indicates the case where the UE initiates NAS procedure to 5GC. If the 5GS registration procedure to the 5GC fails then the UE can initiate the attach procedure to another core network type (e.g. EPC).

There are a few ways to broadcast support of eCall over IMS. Some examples of system information block Type as per the step 1 are shown below.

EXAMPLE 1

E-UTRAN supporting eCall by EPC and not by 5GC broadcasts only eCall over IMS support of EPC bit.

```
SystemInformationBlockType1-v1430-IEs ::= SEQUENCE {
  eCallOverIMS-Support-r14          ENUMERATED {true}
    OPTIONAL,   -- Need OR
  tdd-Config-v1430                  TDD-Config-v1430
    OPTIONAL,   -- Cond TDD-OR
```

```
cellAccessRelatedInfoList-r14           SEQUENCE (SIZE
(1..maxPLMN-1-r14)) OF                  CellAccessRelatedInfo-r14
    OPTIONAL,   -- Need OR
nonCriticalExtension
SystemInfortmationBlock-Type1-v1450-IEs
    OPTIONAL
}
```

EXAMPLE 2

E-UTRAN supporting eCall by EPC and not by 5GC broadcasts both bits support of eCall over IMS by EPC and by 5GC.

```
SystemInformationBlockType1-v1430-IEs ::= SEQUENCE {
    eCallOverIMS-Support-r14            ENUMERATED {true}
        OPTIONAL,   -- Need OR
    eCallOverIMS-Support-r14-5GC        ENUMERATED {false}
        OPTIONAL,   -- Need
    tdd-Config-v1430                    TDD-Config-v1430
        OPTIONAL,   -- Cond TDD-OR
    cellAccessRelatedInfoList-r14       SEQUENCE (SIZE
(1..maxPLMN-1-r14)) OF                  CellAccessRelatedInfo-r14
        OPTIONAL,   -- Need OR
    nonCriticalExtension                SystemInformationBlock-Type1-v1450-IEs
        OPTIONAL
}
```

EXAMPLE 3

E-UTRAN supporting eCall by 5GC and not by EPC broadcasts only eCall over IMS support of 5GC bit.

```
SystemInformationBlockType1-v1430-IEs ::= SEQUENCE {
    eCallOverIMS-Support-5GC            ENUMERATED {true}
        OPTIONAL,   -- Need OR
    tdd-Config-v1430                    TDD-Config-v1430
        OPTIONAL,   -- Cond TDD-OR
    cellAccessRelatedInfoList-r14       SEQUENCE (SIZE (1..maxPLMN-1-r14))
OF                                      CellAccessRelatedInfo-r14
        OPTIONAL,   -- Need OR
    nonCriticalExtension                SystemInformationBlockType1-v1450-IEs
        OPTIONAL
}
```

EXAMPLE 4

E-UTRAN supporting eCall by 5GC and not by EPC broadcasts both bits for support of eCall over IMS by EPC and by 5GC.

```
SystemInformationBlockType1-v1430-IEs ::= SEQUENCE {
    eCallOverIMS-Support-r14            ENUMERATED {false}
        OPTIONAL,   -- Need OR
    eCallOverIMS-Support-r14-5GC        ENUMERATED {true}
        OPTIONAL,   -- Need
    tdd-Config-v1430                    TDD-Config-v1430
        OPTIONAL,   --- Cond TDD-OR
    cellAccessRelatedInfoList-r14       SEQUENCE (SIZE (1..maxPLMN-1-r14))
OF                                      CellAccessRelatedInfo-r14
        OPTIONAL,   -- Need OR
    nonCriticalExtension                SystemInformationBlockType1-v1450-Ies
        OPTIONAL
}
```

EXAMPLE 5

E-UTRAN supporting eCall by both 5GC and EPC broadcasts both bits for support of eCall over IMS by EPC and by 5GC.

```
SystemInformationBlockType1-v1430-IEs ::= SEQUENCE {
    eCallOverIMS-Support-r14              ENUMERATED {true}
    OPTIONAL, -- Need OR
    eCallOverIMS-Support-r14-5GC          ENUMERATED {true}
    OPTIONAL, -- Need
    tdd-Config-v1430                      TDD-Config-v1430
    OPTIONAL, -- Cond TDD-OR
    cellAccessRelatedInfoList-r14         SEQUENCE (SIZE (1...maxPLMN-1-r14))
OF                                        CellAccessRelatedInfo-r14
    OPTIONAL, -- Need OR
    nonCriticalExtension                  SystemInformationBlockType1-v1450-IEs
    OPTIONAL
}
```

Third Embodiment (Solution 3 for Problematic Statement 3)

The E-UTRAN (ng-eNB) which connects to both EPC and 5GC broadcasts one indicator to indicate support of eDRX for 5GC and another indicator for support of eDRX for EPC. The UE when the E-UTRAN is connected to the 5GC reads the eDRX support indicator for 5GC from a system information and uses the eDRX feature in the cell if the cell (i.e. E-UTRAN) indicates support of eDRX for 5GC otherwise the UE does not use the eDRX in the cell even when the E-UTRAN is connected to 5GC. Similarly the cell (i.e. E-UTRAN) broadcasts indicator indicating support of eDRX for EPC. The UE uses the eDRX for EPC in the cell if the indicator indicates support of eDRX for EPC otherwise the UE does not use eDRX for EPC in the cell even when the E-UTRAN is connected to EPC. In one example, if an indicator for eDRX support for 5GC is not broadcasted in the cell then the UE determines that the cell does not support eDRX for 5GC. The UE will follow the same behavior for eDRX support for EPC in the cell. In one example, the current parameter eDRX-Allowed in SystemInformationBlockType1 is used for eDRX support for EPC.

The principle of solution 3 is same as principle of solution 1. The UE and the network behavior (5GC) of solution 3 will follow the UE and network behavior of solution 1.

Another Embodiment

The first embodiment describes at least one indicator to indicate support of IMS emergency services by EPC, 5GC or both EPC and 5GC. Also, the second embodiment describes at least one indicator to indicate support of eCall over IMS by EPC, 5GC or both EPC and 5GC. Furthermore, the third embodiment describes at least one indicator to indicate support of eDRX by EPC, 5GC or both EPC and 5GC. Another embodiment can combine the first embodiment, the second embodiment and the third embodiment. It means the system information which broadcasted by E-UTRAN can include at least two of:

- at least one indicator to indicate support of emergency services by EPC, 5GC or both EPC and 5GC,
- at least one indicator to indicate support of eCall over IMS by EPC, 5GC or both EPC and 5GC, and
- at least one indicator to indicate support of eDRX by EPC, 5GC or both EPC and 5GC.

At least two of the parameters means:

- at least one indicator to indicate support of emergency services by EPC, 5GC or both EPC and 5GC, and at least one indicator to indicate support of eCall over IMS by EPC, 5GC or both EPC and 5GC,
- at least one indicator to indicate support of eCall over IMS by EPC, 5GC or both EPC and 5GC, and at least one indicator to indicate support of eDRX by EPC, 5GC or both EPC and 5GC,
- at least one indicator to indicate support of emergency services by EPC, 5GC or both EPC and 5GC, and at least one indicator to indicate support of eDRX by EPC, 5GC or both EPC and 5GC,
- at least one indicator to indicate support of emergency services by EPC, 5GC or both EPC and 5GC, at least one indicator to indicate support of eCall over IMS by EPC, 5GC or both EPC and 5GC, and at least one indicator to indicate support of eDRX by EPC, 5GC or both EPC and 5GC.

The term "UE" is generally intended to be synonymous with the term mobile station, mobile device, wireless device, and includes standalone mobile stations, such as terminals, cell phones, smart phones, tablets, cellular IoT devices, IoT devices, machinery. The term "UE" is also UE that is used by 3GPP.

A UE may be an equipment for production, energy related machinery (such as boilers, engines, turbines, solar panel, wind turbines, hydroelectric generator, thermal power generator, nuclear electricity generator, batteries, nuclear systems and equipment, heavy electrical machinery, pumps, compressors, vacuum pumps, fans, blowers, oil hydraulic equipment, pneumatic equipment, metal working machinery, manipulators, robots and their application systems, tools, molds and dies, rolls, conveying, elevating, materials handling equipment and their application systems, textile machinery, sewing machine, printing and related machinery, paper converting machinery, chemical machinery, mining and construction machinery and equipment, machinery and implements for agriculture, forestry and fisheries, safety and environment preservation equipment, tractor, construction machine, precision bearings, chains, gear, power transmission, lubricating equipment, valve, pipe fitting, etc.)

A UE may be a transport equipment (such as rolling stocks, motor vehicle, motor cycle, bicycle, train, bus, carts, rickshaw, ship and watercraft, aircraft, rocket, satellite, drone, balloon, etc.)

A UE may be an information and communication equipment (such as electronic computer) and related equipment, communication and related equipment, electronic component, etc.

A UE may be a refrigerating machine, a refrigerating machine applied product, trade and service industry equipment, vending machine, automatic service machine, office machine and equipment, consumer electronic and electronic appliance (such as audio equipment, video equipment, loud speaker, radio, television, microwave oven, rice cooker, coffee machine, dishwasher, washing machine, dryer, electronic fans and related appliance, cleaner, etc.)

A UE may he an electrical application system (such as x-ray system, particle accelerator, radio isotope equipment, sonic equipment, electromagnetic application equipment, electronic power application equipment, etc.).

A UE may be an electronic lamp, luminaire, measuring instrument, analyzer, tester and surveying instrument (such as smoke alarm, human alarm sensor, motion sensor, wireless tag, etc.), watches and clock, laboratory instrument, optical apparatus, medical equipment and system, weapon, cutlery, hand tool.

A UE may be a wireless-equipped personal digital assistants (such as wireless cards or modules) that are designed for attachment to or insertion into another electronic device (for example a personal computer, electrical measuring machine).

A UE may be a device or a part of system that provides applications, services, and solutions described below, as to "internee of things (IoT)", using a variety of wired and/or wireless communication technologies.

Applications, services, and solutions may be MVNO (Mobile Virtual Network Operator) service, emergency radio communication system, PBX (Private Branch eXchange) system, PHS/Digital Cordless Telecommunications system, POS system, advertise calling system, MBMS (Multimedia Broadcast and Multicast Service), V2X (Vehicle to Everything) system, train radio system, location related service, Disaster/Emergency Wireless Communication Service, community service, video streaming service, femto cell application service, VoLTE service, charging service, radio on demand service, roaming service, activity monitoring service, telecom carrier/communication NW selection service, functional restriction service, PoC (Proof of Concept) service, personal information management service, ad hoc network/DTN (Delay Tolerant Networking) service, etc.

Further, the above-described UE are merely examples of applications of the technical ideas obtained by the inventor. Needless to say, these technical ideas are not limited to the above-described UE and various modifications can be made thereto.

AS (Access Stratum) layer may include an RRC layer, a SADP layer, a PDCP layer, a RLC layer, a MAC layer and PHY layer.

NG-RAN may include an eNB (evolved E-UTRAN) connected with 5GC and gNB.

NAS (Non Access Stratum) layer include an EMM (EPS Mobility Management) and an ESM (EPS Session Management).

The UE may have two entities for NAS layer. One entity is for EPC NAS layer. Other entity is for 5GC NAS layer. Therefore, in the above embodiments, the UE may forward the received indicator related to support of emergency services by EPC (e.g. ims-EmergencySupport-r9 is set to "TRUE") to the entity for EPC NAS layer as an upper layer. In the same way, in the above embodiments, the UE may forward the received indicator related to support of emergency services by 5GC (e.g. ims-EmergencySupport-5GC-r15 is set to "TRUE") to the entity for 5GC NAS layer as an upper layer.

User Equipment (UE)

Figure 4:
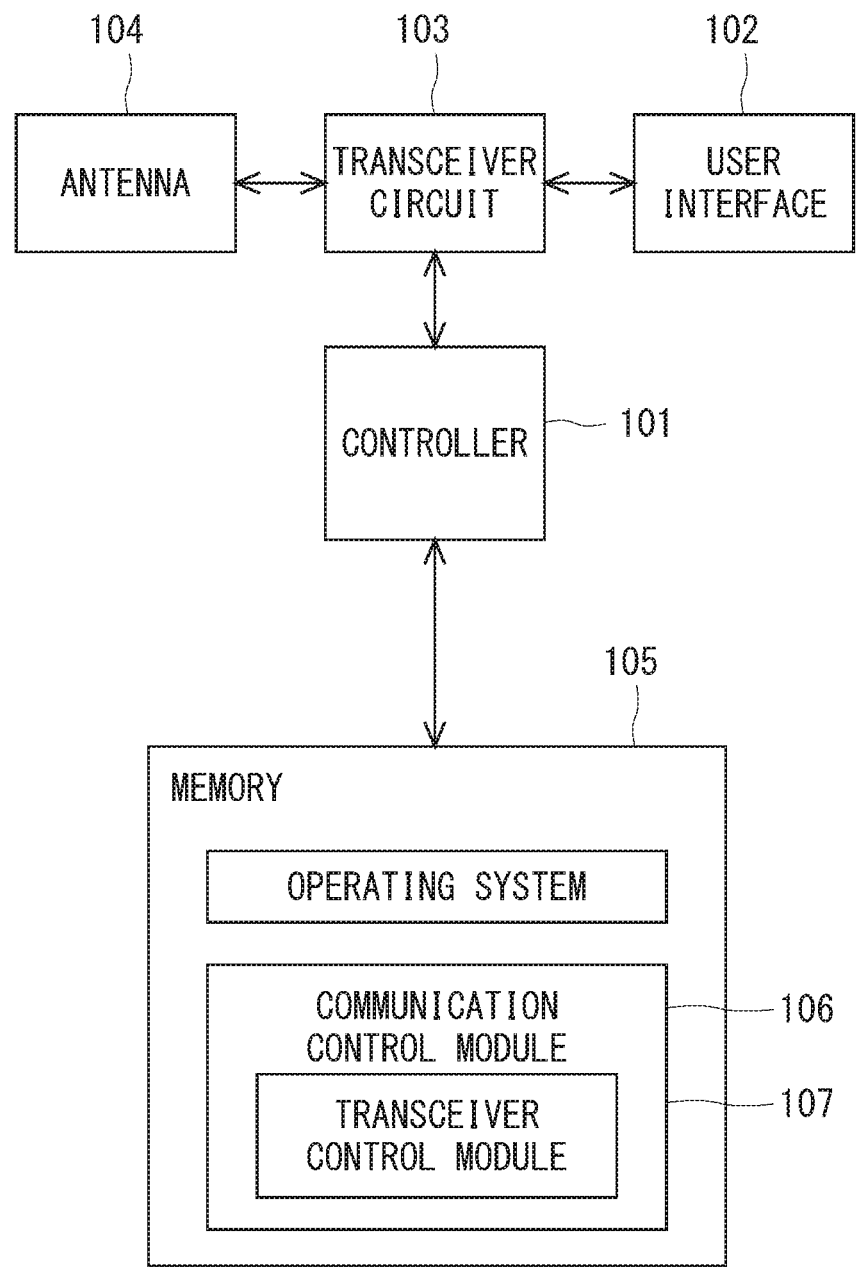
FIG. 4 shows a bock diagram for UE.

FIG. 4 is a block diagram illustrating the main components of the UE. As shown, the UE (100) includes a transceiver circuit (103) which is operable to transmit signals to and to receive signals from the connected node(s) via one or more antenna (104). Although not necessarily shown in FIG. 4, the UE will of course have all the usual functionality of a conventional mobile device (such as a user interface (102)) and this may be provided by any one or any combination of hardware, software and firmware, as appropriate. Software may be pre-installed in the memory and/or may be downloaded via the telecommunication network or from a removable data storage device (RMD), for example.

A controller (101) controls the operation of the UE in accordance with software stored in a memory (105). The software includes, among other things, an operating system and a communications control module (106) having at least a transceiver control module (107). The communications control module (106) (using its transceiver control sub-module) is responsible for handling (generating/sending/receiving) signalling and uplink/downlink data packets between the UE and other nodes, such as the base station/(R)AN node, the MME, the AMF (and other core network nodes). Such signalling may include, for example, appropriately formatted signalling messages relating to connection establishment and maintenance (e.g. RRC connection establishment and other RRC messages), periodic location update related messages (e.g. tracking area update, paging area updates, location area update) etc. Such signalling may also include, for example, broadcast information (e.g. Master Information and System information) in a receiving case.

(R)AN Node

Figure 5:
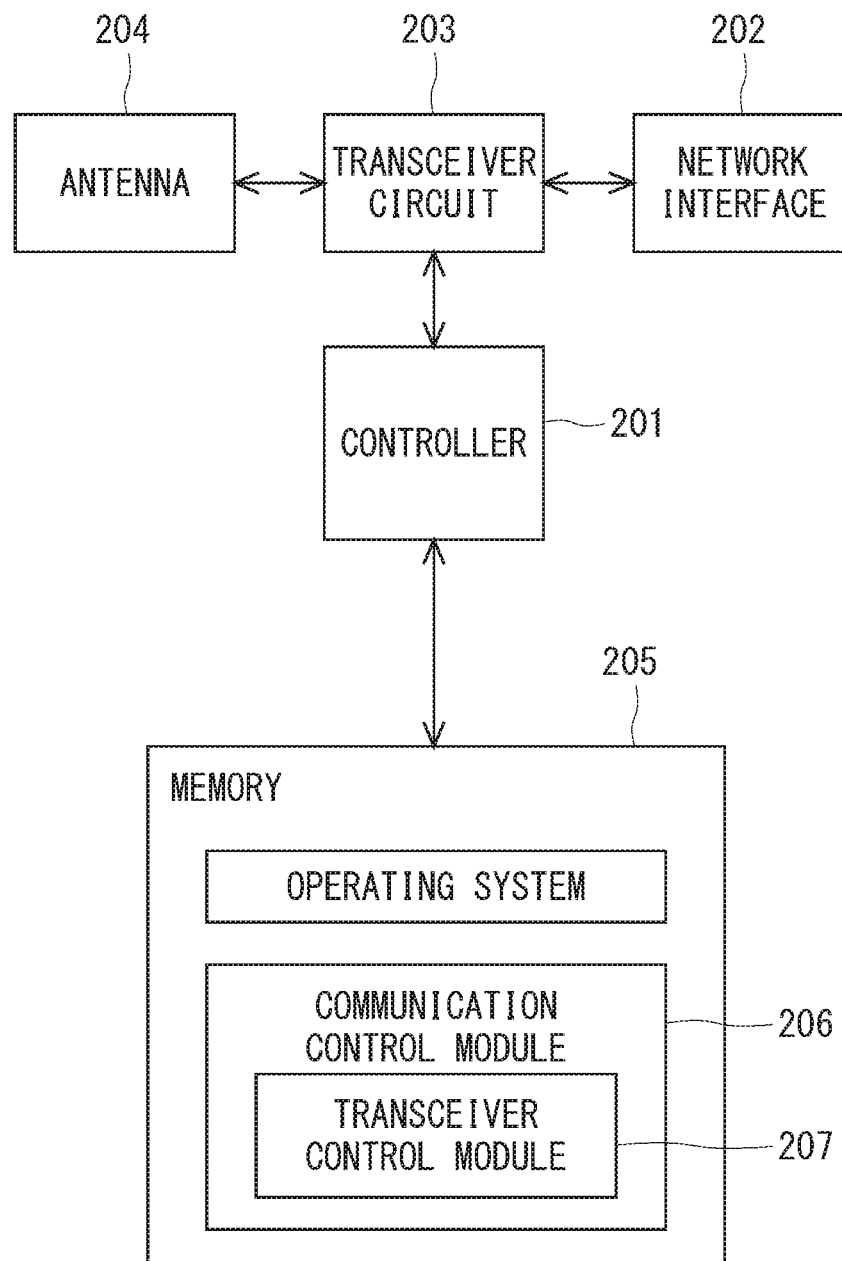
FIG. 5 shows a bock diagram for (R)AN node.

FIG. 5 is a block diagram illustrating the main components of an exemplary (R)AN node (200). The (R)AN node (200) includes 3GPP Access Node and Non 3GPP Access Node. The 3GPP Access Node may be, a base station ('eNB' in LTE, 'gNB' in 5G). As shown, the (R)AN node (200) includes a transceiver circuit (203) which is operable to transmit signals to and to receive signals from connected UE(s) via one or more antenna (204) and to transmit signals to and to receive signals from other network nodes (either directly or indirectly) via a network interface (202). A controller (201) controls the operation of the (R)AN node in accordance with software stored in a memory (205). Software may be pre-installed in the memory and/or may be downloaded via the telecommunication network or from a removable data storage device (RMD), for example. The software includes, among other things, an operating system and a communications control module (206) having at least a transceiver control module (207).

The communications control module (206) (using its transceiver control sub-module) is responsible for handling (generating/sending/receiving) signalling between the (R)AN node and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), messages by Y2 reference point, etc. Such signalling may also include, for example, broadcast information (e.g. Master Information and System information) in a sending case.

The controller is also configured (by software or hardware) to handle related tasks such as, when implemented, UE mobility estimate and/or moving trajectory estimation.

AMF

Figure 6:
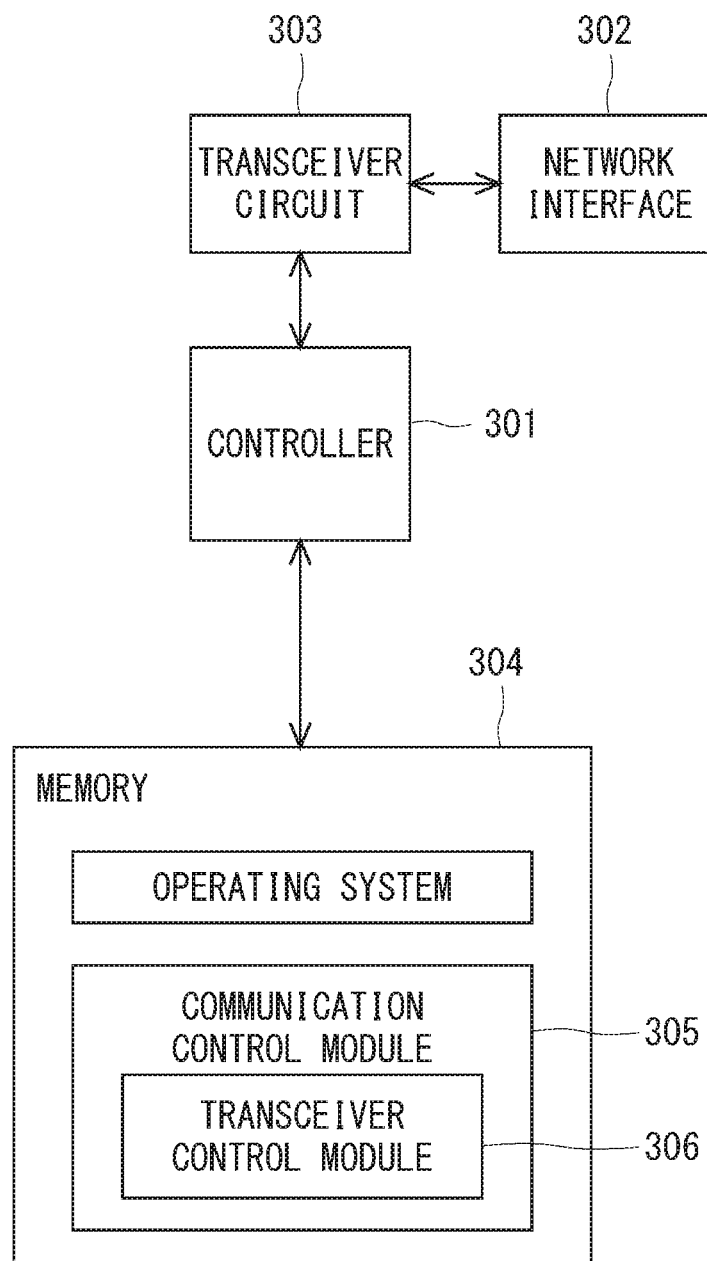
FIG. 6 shows a bock diagram for AMF.

FIG. 6 is a block diagram illustrating the main components of the AMF (300). The AMF (300) is included in the 5GC. As shown, the AMF (300) includes a transceiver circuit (303) which is operable to transmit signals to and to receive signals from other nodes (including the UE) via a network interface (302). A controller (301) controls the operation of the AMF (300) in accordance with software stored in a memory (304). Software may be pre-installed in the memory (304) and/or may be downloaded via the telecommunication network or from a removable data storage device (RMD), for example. The software includes, among other things, an operating system and a communications control module (305) having at least a transceiver control module (306).

The communications control module (using its transceiver control sub-module) is responsible for handling (generating/sending/receiving) signalling between the AMF and other nodes, such as the UE, base station/(R)AN node (e.g. "EUTRAN Node" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

MME

Figure 7:
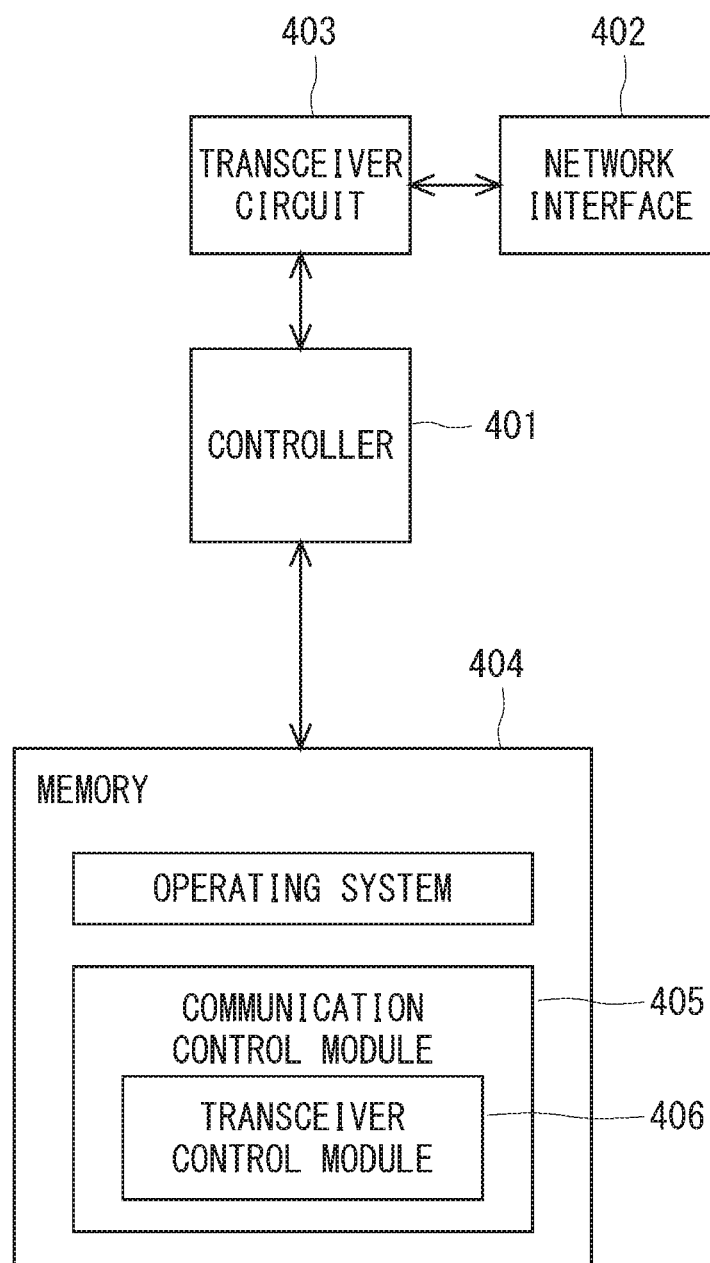
FIG. 7 shows a bock diagram for MME.

FIG. 7 is a block diagram illustrating the main components of the MME (400). The MME (400) is included in the EPC. As shown, the MME (400) includes a transceiver circuit (403) which is operable to transmit signals to and to receive signals from other nodes (including the UE) via a network interface (402). A controller (401) controls the operation of the MME (400) in accordance with software stored in a memory (404). Software may be pre-installed in the memory (404) and/or may be downloaded via the telecommunication network or from a removable data storage device (RMD), for example. The software includes, among other things, an operating system and a communications control module (405) having at least a transceiver control module (406).

The communications control module (using its transceiver control sub-module) is responsible for handling (generating/sending/receiving) signalling between the MME and other nodes, such as the UE, base station/(R)AN node (e.g. "EUTRAN Node" or "eNB") (directly or indirectly). Such signalling may include, for example, appropriately formatted signalling messages relating to the procedures described herein, for example, S1 AP message to convey an NAS message from and to the UE, etc.

This application is based upon and claims the benefit of priority from Indian patent applications No. 201811011621, filed on Mar. 28, 2018, the disclosure of which is incorporated herein in its entirety by reference.

REFERENCE SIGNS LIST

100 UE
101 controller
102 user interface
103 transceiver circuit
104 antenna
105 memory
106 control module
107 transceiver control module
200 (R)AN node
201 controller
202 network interface
203 transceiver circuit
204 antenna
205 memory
206 communications control module
207 transceiver control module
300 AMF
301 controller
302 network interface
303 transceiver circuit
304 memory
305 communications control module
306 transceiver control module
400 MME
401 controller
402 network interface
403 transceiver circuit
404 memory
405 communications control module
406 transceiver control module

The invention claimed is:

1. A method of a user equipment, the method comprising:
receiving system information block type 1 message that is broadcasted in a cell operated by an Access Network node that is connected to both Evolved Packet Core (EPC) and 5th Generation Core (5GC), the system information block type 1 message indicative of whether the cell supports Internet Protocol (IP) Multimedia Subsystem (IMS) emergency services via each of the EPC and the 5GC for the user equipment in limited service state, by including at least one of:
  ims-EmergencySupport information indicating that the cell supports IMS emergency services via the EPC for the user equipment in limited service state, and
  ims-EmergencySupport5GC information indicating that the cell supports IMS emergency services via the 5GC for the user equipment in limited service state; and
determining that the cell supports IMS emergency services via at least one of the EPC and the 5GC, based on both of:
  whether or not the ims-EmergencySupport information is present in the system information block type 1 message, and
  whether or not the ims-EmergencySupport5GC information is present in the system information block type 1 message, wherein
the method further comprises:
  initiating IMS emergency services to the EPC only, in a case where the cell supports IMS emergency services via the EPC and the cell does not support IMS emergency services via the 5GC,
  initiating IMS emergency services to the 5GC only, in a case where the cell supports IMS emergency services via the 5GC and the cell does not support IMS emergency services via the EPC, or
  initiating IMS emergency services to either the EPC or the 5GC, in a case where the cell supports IMS emergency services via both the EPC and the 5GC, wherein the initiating IMS emergency services to the EPC is performed upon determining, by the UE, that IMS emergency services on the 5GC would fail, wherein the system information block type 1 message:

indicates that the cell supports IMS emergency services via the EPC based on a value of the ims-EmergencySupport information being set to TRUE, indicates that the cell does not support IMS emergency services via the EPC based on the ims-EmergencySupport information being absent from the system information block type 1 message, indicates that the cell supports IMS emergency services via the 5GC based on a value of the ims-EmergencySupport5GC information being set to TRUE, indicates that the cell does not support IMS emergency services via the 5GC based on the ims-EmergencySupport5GC information being absent from the system information block type 1 message, and indicates that the cell supports IMS emergency services via both the EPC and the 5GC based on the value of the ims-EmergencySupport information being set to TRUE and the value of the ims-EmergencySupport5GC information being set to TRUE.

2. The method according to claim 1, wherein the initiating IMS emergency services to the EPC is performed in a case where the cell supports IMS emergency services via the EPC and the cell does not support IMS emergency services via the 5GC, or the initiating IMS emergency services to the 5GC is performed in a case where the cell supports IMS emergency services via the 5GC and the cell does not support IMS emergency services via the EPC.

3. The method according to claim 1, further comprising:

not initiating IMS emergency services to the 5GC, in a case where the cell supports IMS emergency services via the EPC and the cell does not support IMS emergency services via the 5GC; and not initiating IMS emergency services to the EPC, in a case where the cell supports IMS emergency services via the 5GC and the cell does not support IMS emergency services via the EPC.

4. The method according to claim 1, wherein the initiating IMS emergency services to the EPC is performed upon determining, by the user equipment, that the IMS emergency services on the 5GC have failed.

5. A user equipment comprising:

a transceiver; and a controller configured to:

receive, via the transceiver, system information block type 1 message that is broadcasted in a cell operated by an Access Network node that is connected to both Evolved Packet Core (EPC) and 5th Generation Core (5GC), the system information block type 1 message indicative of whether the cell supports Internet Protocol (IP) Multimedia Subsystem (IMS) emergency services via each of the EPC and the 5GC for the user equipment in limited service state, by including at least one of:

ims-EmergencySupport information indicating that the cell supports IMS emergency services via the EPC for the user equipment in limited service state, and ims-EmergencySupport5GC information indicating that the cell supports IMS emergency services via the 5GC for the user equipment in limited service state; and determine that the cell supports IMS emergency services via at least one of the EPC and the 5GC, based on both of:

whether or not the ims-EmergencySupport information is present in the system information block type 1 message, and whether or not the ims-EmergencySupport5GC information is present in the system information block type 1 message, wherein the controller is further configured to:

initiate IMS emergency services to the EPC only, in a case where the cell supports IMS emergency services via the EPC and the cell does not support IMS emergency services via the 5GC, initiate IMS emergency services to the 5GC only, in a case where the cell supports IMS emergency services via the 5GC and the cell does not support IMS emergency services via the EPC, or initiate IMS emergency services to either the EPC or the 5GC, in a case where the cell supports IMS emergency services via both the EPC and the 5GC, wherein the initiating IMS emergency services to the EPC is performed upon determining, by the UE, that IMS emergency services on the 5GC would fail, wherein the system information block type 1 message:

indicates that the cell supports IMS emergency services via the EPC based on a value of the ims-EmergencySupport information being set to TRUE, indicates that the cell does not support IMS emergency services via the EPC based on the ims-EmergencySupport information being absent from the system information block type 1 message, indicates that the cell supports IMS emergency services via the 5GC based on a value of the ims-EmergencySupport5GC information being set to TRUE, indicates that the cell does not support IMS emergency services via the 5GC based on the ims-EmergencySupport5GC information being absent from the system information block type 1 message, and indicates that the cell supports IMS emergency services via both the EPC and the 5GC based on the value of the ims-EmergencySupport information being set to TRUE and the value of the ims-EmergencySupport5GC information being set to TRUE.

6. The user equipment according to claim 5, wherein the user equipment initiates IMS emergency services to the EPC if the cell supports IMS emergency services via the EPC and if the cell does not support IMS emergency services via the 5GC, or the user equipment initiates IMS emergency services to the 5GC if the cell supports IMS emergency services via the 5GC and if the cell does not support IMS emergency services via the EPC.

7. The user equipment according to claim 5, wherein the controller is configured to:

not initiate IMS emergency services to the 5GC, in a case where the cell supports IMS emergency services via the EPC and the cell does not support IMS emergency services via the 5GC, and not initiate IMS emergency services to the EPC, in a case where the cell supports IMS emergency services via the 5GC and the cell does not support IMS emergency services via the EPC.

8. The user equipment according to claim 5, wherein the user equipment initiates IMS emergency services to the EPC upon determining that the IMS emergency services on the 5GC have failed.

* * * * *